United States Patent [19]

Koizumi et al.

[11] Patent Number: 4,707,528

[45] Date of Patent: Nov. 17, 1987

[54] POLYAMIDE RESIN COMPOSITION

[75] Inventors: Junji Koizumi; Kouji Sasaki; Junichiro Naito, all of Aichi, Japan

[73] Assignee: Toyoda Gosei Co., Ltd., Nishikasugai, Japan

[21] Appl. No.: 758,802

[22] Filed: Jul. 25, 1985

[30] Foreign Application Priority Data

Jul. 30, 1984 [JP] Japan .................................. 59-157301
Oct. 11, 1984 [JP] Japan .................................. 59-211239

[51] Int. Cl.$^4$ ............................................. C08L 77/00
[52] U.S. Cl. ..................................... 525/432; 525/404; 525/184; 524/220; 527/600
[58] Field of Search ....................... 525/432, 404, 184; 524/220; 527/600

[56] References Cited

U.S. PATENT DOCUMENTS

| | | |
|---|---|---|
| 3,428,710 | 2/1969 | Daumiller et al. |
| 4,032,479 | 6/1977 | Bunnomori et al. ................ 525/404 |
| 4,173,556 | 11/1979 | Coran et al. ......................... 524/169 |
| 4,297,453 | 10/1981 | Coran et al. ......................... 525/408 |

FOREIGN PATENT DOCUMENTS

| | | |
|---|---|---|
| 1102940 | 3/1961 | Fed. Rep. of Germany . |
| 1620805 | 5/1970 | Fed. Rep. of Germany . |
| 2550803 | 5/1976 | Fed. Rep. of Germany . |
| 2654346 | 6/1978 | Fed. Rep. of Germany . |
| 2716004 | 10/1978 | Fed. Rep. of Germany . |

OTHER PUBLICATIONS

Gachter/Muller, 'Handbuch der Kunststoffadditive', ISBN 3-466-13 689-4, (Manual of Plastic Additives), p. 294.
Abstract of JP-PS No. 59-109 539.

Primary Examiner—John Kight
Assistant Examiner—M. L. Moore
Attorney, Agent, or Firm—Cushman, Darby & Cushman

[57] ABSTRACT

A polyamide resin composition is described, which is characterized by blending a polyamide resin with a composition (A) comprising (i) either polyamide-rubber copolymer or polyolefin resin, and (ii) a tackiness providing resin wherein either said polyamide-rubber copolymer or the polyolefin resin is from 80 to 20% by weight based on the composition (A), and the tackiness providing resin is from 20 to 80% by weight based on the composition (A).

3 Claims, No Drawings

POLYAMIDE RESIN COMPOSITION

FIELD OF THE INVENTION

The present invention relates to a polyamide resin composition having an excellent vibration controlling performance within a wide temperature range from low to high temperatures and excellent strength characteristics.

BACKGROUND OF THE INVENTION

In general, it has been recently proposed to exchange various kinds of metallic parts of motorcars for plastic products and put into practice because plastic materials are lighter than metallic materials. Among plastic products, polyamide resin products are excellent in toughness, heat resistance, oil resistance, etc., so that they are often applied to parts, which are used at a high temperature, such as a cylinder head cover, an oil pan. From the viewpoint of noise control of motorcars, these plastic products are expected to provide significant improvement of vibration control and sound insulation. They are thus useful for reasons other than their light weight. However, there is a problem in which it cannot be expected for polyamide resin products to effect the vibration control, because the vibration controlling performance due to the viscoelastic properties of plastic materials is seriously lowered under a high temperature condition near to 100° C. for example in a cylinder head cover or an oil pan. This is due to the fact that on one hand plastic materials in general have highly viscoelastic properties and expected vibration controlling performances but, on the other hand, they depend on temperature so that their vibration controlling performances are best at about the temperature at which the loss tangent of dynamic dispersion due to the glass transition of plastic material (hereinafter referred to as "tan δ", cf. the note of Table 1) is maximum, and in general remarkably lowered at a temperature in the range of practical uses. For instance, in common polyamide resins such as nylon 12, nylon 6 and nylon 66, the maximum value of tan δ due to the glass transition appears in general at about 50° C. and the value of tan δ becomes very small at higher temperatures. Thus, the lowering of the value tan δ is a main reason why a great vibration controlling effect is not expected under a condition for the usage at high temperature.

As a method to improve the above undesired property of polyamide resin, it has been proposed in U.S. Pat. No. 3,472,818 to shift the glass transition temperature of polyamide resin to high temperature, for example, to copolymerize with a small molecular monomer, such as aromatic monomers or cyclohexane ring containing monomers. However, any substantial effect could not be expected for such a method because of problems such as the reduction of workability, the lowering of vibration controlling performance at low temperature, etc. From the viewpoint of keeping vibration controlling characteristics in a wide range of temperature, the most expected method is to modify polyamide resins by providing multicomponent-multiphase polymers by blending polymers or grafting. However, polymers which can be blended to polyamide resin without any great lowering of strength, etc., are limited and these polymers such as nitrile rubber, acid-modified EPDM, ionomers, etc., are known, but the glass transition temperatures of these are less than 0° C. and a good improvement is not found out at high temperature. To further disadvantage nitrile rubber lowers the heat resistance, and both acid-modified EPDM and ionomers decrease the heat and oil resistance. The grafting method as described in U.S. patent application Ser. No. 580,513, filed on May 23, 1985, U.S. Pat. No. 4,505,716, also has been not satisfied because polymers capable of being grafted with polyamide resin are limited and an increased cost is results in such a method.

Therefore, the present inventors have made various studies to produce a polyamide resin composition having an excellent vibration controlling performance within a wide temperature range from low up to high temperatures and excellent strength characteristics. This object can be achieved by the present invention which will be described hereinafter in detail.

SUMMARY OF THE INVENTION

An object of the present invention is to provide a new polyamide resin composition, characterized by blending a polyamide resin with a composition (hereinafter referred to as composition (A)) comprising (i) either polyamide-rubber copolymer or polyolefin resin and (ii) a tackiness providing resin, wherein either the polyamide-rubber copolymer or polyolefin resin is from 80 to 20% by weight based on composition (A), and said tackiness providing resin is from 20 to 80% by weight based on the composition (A).

The present inventors have made various studies to obtain a polyamide resin composition having an excellent vibration controlling performance within a wide range from low up to high temperatures and excellent strength characteristics and it has been found that a polyamide resin composition can satisfy the above mentioned requirements which is obtained by blending a polyamide resin with a mixed composition of a polyamide-rubber copolymer which has good compatibility with polyamide resin and a tackiness providing resin which can form at least partially a homogeneous phase with said copolymer, or a mixed composition of a tackiness providing resin and a polyolefin which has good compatibility with said tackiness providing resin and polyamide resin.

DETAILED DESCRIPTION OF THE INVENTION

The present invention is described hereinafter in detail.

The tackiness providing resin used in the above mentioned composition that is blended to polyamide resin in the new polyamide resin composition according to the present invention is a general tackiness providing substance which is blended in natural rubber, synthetic rubber, blended natural-synthetic rubber, rubber adhesive, latex and the like for the purpose to increase the tackiness of the surfaces of these blend, i.e., a resin material which has such a property that it can be used as a tackifier. In general, all resinous materials which may be used or are used as tackifiers can be used in the present invention. Examples of such resinous materials include, for example, resin materials for tackifiers or cumarone resin series such as cumarone-indene resin, cumarone resin admixtures (e.g., admixtures of cumarone resin, naphthene oils, phenol resins, rosin and the like) and the like; resin materials for tackifiers of phenol-terpene resin series such as p-tert-butylphenol-acethylene resin, phenol-formaldehyde resin, terpene-phenol resin, polyterpene resin, xylene-formaldehyde resin and the like; resin materials for tackifiers of hydrocarbon resins of petroleum series such as synthetic polyterpene resin, aromatic hydrocarbon resin, aliphatic hydrocarbon resin, aliphatic cyclic hydrocarbon resin, unsaturated hydrocarbon polymer, isoprene resins, hydrogenated hydrocarbon resin, tackified resins of hydrocarbon series, polymeric special polyesters, polybutene, atactic polypropylene, liquid polybutadiene, butyl rubber of low molecular weight and the like; resin materials for tackifiers of rosin derivative series such as pentaerythritol esters of rosin and glycerol esters of rosin, hydrogenated rosins, highly hydrogenated wood rosin, methyl esters of hydrogenated rosin, triethylene glycol esters of hydrogenated rosin, pentaerythritol esters of hydrogenated rosin and other esters of hydrogenated rosin, resins of high melting point ester series, polymerized rosin, glycerol esters of polymerized rosin, zinc resinate, hardened rosin and the like; various kinds of resin materials to be used for tackifiers such as a mixture of resin acid and amine-resin soap, a condensate of synthetic resin and phthalic acid ester, and the like.

The polyamide-rubber copolymer used in the composition according to the present invention is a block copolymer or graft copolymer of polyamide and rubber; the polyamide includes, for example, a linear crystalline molecule of high molecular weight having amido groups in the molecular chain, such as nylon 6, nylon 66, nylon 11, nylon 12, nylon 610, nylon 612 and nylon 69. The polyamide may be a copolymer of nylon. The rubber may be an amorphous high molecular weight substance having a glass transition temperature of less than 20° C., for example, such as polybutadiene, a styrene-butadiene copolymer, an acrylonitrile-butadiene copolymer, polyisoprene, polychloroprene, an isobutylene-isoprene copolymer, an ethylene-propylene copolymer (EPM, EPDM), chlorosulfonated polyethylene, chlorinated polyethylene, an epichlorohydrin polymer, an epichlorohydrin-ethylene oxide copolymer, an acrylic acid alkyl ester copolymer, polyurethane, polysiloxane, a polyether rubber, a polyester rubber, and copolymers thereof. Preferred examples include polyether rubbers which are polyalkylene oxide glycols such as polyethylene oxide glycol, polypropylene oxide glycol, polytetramethylene oxide glycol, polyhexamethylene oxide glycol and the like. It is important that these block or graft copolymers of polyamide and rubber have a good compatibility with the tackiness providing resin and a high value of tan δ within the necessary temperature range depending on the combination with the tackiness providing resin and that the polyamide block chain may serve as compatible agent for a polyamide resin to prevent lowering of strength. All polyamide-rubber copolymers which have such functions as mentioned above can be used in the composition according to the present invention.

When the polyamide-rubber copolymer is a polyamide-polyether block copolymer, the hydrogenated rosin ester resin and terpene-phenol resin among tackiness providing resins as mentioned above have a good compatibility with the polyamide-rubber copolymer resulting in good results.

It is important that the tackiness providing resin and the polyamide-rubber copolymer used are at least partially compatible. When the tan δ relative to dynamic viscoelasticity of the mixture has the maximum value, the glass transition temperature thereof is present within the range of usable temperature and preferably the loss modulus of dynamic viscoelasticity is maintained at a high value over a wide range of usable temperature. Accordingly, it is necessary to adjust the compatibility with the polyamide-rubber copolymer used. The desirable condition for a temperature used can be obtained by controlling the optimum combination and the amount of the tackiness providing resins used. All kinds of tackiness providing resins having functions as mentioned above can be used. It is desirable to select tackiness providing resins which are not compatible with a polyamide resin not so as to change the workability of polyamide resin itself.

In the ratio of the tackiness providing resin and the polyamide-rubber copolymer in the composition according to the present invention, the tackiness providing resin is 20 to 80% by weight based on the composition (A), and the polyamide-rubber copolymer is 80 to 20% by weight based on the composition (A). When the amount of tackiness providing resin is less than 20% by weight, the vibration controlling effect is scarcely improved. When the amount is more than 80% by weight, the strength is remarkably decreased or mixing of the components can be effected only with difficulties. A composition ratio of the tackiness providing resin and the polyamide-rubber copolymer may be determined within the range as mentioned above depending on the kind and the property (softening temperature, etc.) of the tackiness providing resins and the polyamide-rubber copolymers.

Further, the polyolefin resins used in the composition according to the present invention are those which have functional groups in a molecular chain that may react with the polyamide resin or improve the compatibility with the polyamide resin, such as carboxyl group, epoxy group and the like. Preferred are polymers or copolymers consisting of at least one α-olefin monomer such as ethylene, propylene and the like and containing at least one functional group such as carboxyl group, carboxylic acid salt, acid anhydride, epoxy group and the like in the molecule. Typical examples of the polyolefin resins include acid modified polyolefin resins such as polyethylene, polypropylene, ethylene-propylene copolymer, ethylene-vinyl acetate copolymer which are modified by an unsaturated carboxylic acid such as maleic anhydride, fumaric anhydride; or ionic ethylene copolymers having the so-called ionomer structure, which are terpolymer or quarterpolymer comprising ethylene, a metal salt of unsaturated carboxylic acid, unsaturated carboxylic acid or unsaturated carboxylic acid ester.

These modified polyolefin resins have a good compatibility with the tackiness providing resin, can provide a high value of tan δ within a usable temperature range by the combination with the tackiness providing resin, further prevent the drop of strength because the functional groups such as carboxyl group act as compatible agents for the polyamide resin. All kinds of modified polyolefin resins having such functions as mentioned above may be used in the composition according to the present invention.

When the modified polyolefin resin is an ionic ethylene copolymer or an acid modified polyethylene, the hydrogenated rosin ester resin and the terpene-phenol resin among tackiness providing resins as mentioned above have a good compatibility with the ionic ethylene copolymer or acid modified polyethylene, and good results can be obtained.

It is important that the tackiness providing resin and the polyolefin resin used are at least partially compatible. When the tan δ relative to the dynamic viscoelasticity of the mixture has the maximum value, the glass transition temperature thereof is present within the range of usable temperature and preferably the loss modulus of dynamic viscoelasticity is maintained at a high value over a range of temperature. Accordingly, it is necessary to adjust the compatibility between the tackiness providing resin and the polyolefin resin used. The desirable condition for a temperature used can be obtained by controlling the kind and amount of tackiness providing resins used. All kinds of tackiness providing resins which may provide desired properties can be used.

In the ratio of the tackiness providing resin to the functional group-containing polyolefin resin in the composition according to the present invention, the tackiness providing resin is 20 to 80% by weight based on the composition (A), and the functional group-containing polyolefin resin is 80 to 20% by weight based on the composition (A). When the amount of tackiness providing resin is less than 20% by weight, the vibration controlling effect is scarcely improved. When the amount is more than 80% by weight, the strength is remarkably decreased and mixing of the components can be effected only with difficulty.

A composition ratio of the tackiness providing resin to the polyolefin resin may be determined within the range as mentioned above depending on the kind and property (softening temperature, etc.) of the tackiness providing resin and the polyolefin resin.

The polyamide resin, to which the composition (A) comprising the tackiness providing resin as mentioned above and either the polyamide-rubber copolymer or the polyolefin resin is added, includes a thermoplastic crystalline, high molecular weight polyamide such as, for example, nylon 6, nylon 66, nylon 12, nylon 610, nylon 612, nylon 69 and the like; the copolymer thereof; the mixture thereof; the polyamide which is modified in a small amount of an acid modified EPDM or ionomer; and thermoplastic polyamide copolymerized with an aromatic monomer such as meta-xylylenediamine and the like, a monomer having a cyclohexane ring, or a monomer having a triazole ring.

In the blending ratio of the composition (A) consisting of the tackiness providing resin and the polyamide-rubber copolymer, the polyamide resin is preferably 90 to 50% by weight based on the polyamide resin composition (the composition (A) + the polyamide resin), and the composition (A) is 10 to 50% by weight based on the polyamide resin composition. More preferably, the polyamide resin is 80 to 60% by weight based on the polyamide resin composition, and the composition (A) is 20 to 40% by weight based on the polyamide resin composition.

In the blending ratio of the composition (A) consisting of the tackiness providing resin and the polyolefin resin as mentioned above, the polyamide resin is preferably 90 to 50% by weight based on the polyamide resin composition, and the composition (A) is 10 to 50% by weight based on the polyamide resin composition. More preferably, the polyamide resin is 80 to 60% by weight based on the polyamide resin composition, and the composition (A) is 20 to 40% by weight based on the polyamide resin composition.

When the amount of the composition (A) is less than 10% by weight, the vibration controlling (tan δ) effect is scarcely improved. When the amount is more than 50% by weight, the strength (tensile strength, elongation at break) and the heat resistance are relatively decreased, for example, the resulting composition can occasionally not be used at a high temperature of more than 120° C.

As means for blending in the preparation of the new polyamide resin composition according to the present invention, there may be used a conventional resin blending apparatus, such as roll, kneader, Bravender mixer, monoaxial extruder, two-axial extruder, etc., wherein a general method using a blending apparatus which can be heated to a temperature higher than the softening temperature or melting point of the tackiness providing resin, polyamide-rubber copolymer, functional group-containing polyolefin resin or polyamide resin is used. For example, nylon 6 is used as the polyamide resin and a two-axial extruder as a blending apparatus, a method is used wherein the temperatures of cylinder, adaptor and head of the two-axial extruder are adjusted at about 230° to 250° C. and the tackiness providing resin, either polyamide-rubber copolymer or functional group-containing polyolefin resin, and nylon 6 in the form of pellet or powder are previously sufficiently mixed at room temperature and then mix-extruded; preferably, a two-stage method may be used in which the tackiness providing resin and either the polyamide-rubber copolymer or functional group-containing polyolefin resin are previously mix-extruded in a two-axial extruder and then the resulting mixed composition is mix-extruded together with the polyamide resin. In the mixing of the tackiness providing resin and either the polyamide-rubber copolymer or functional group-containing polyolefin resin, a thickening filler such as silica, etc., and a crosslinking agent for polyamide such as phenol resin, epoxy resin and the like are added in a small amount to increase the viscosity, thereby the workability in handling may be improved.

The polyamide resin composition according to the present invention may be modified by a method which is carried out conventionally for the improvement of thermoplastic resin. For example, glass fibers, talc, etc., may be filled to improve the rigidity and a blend of elastomer, pigments, a processing aid may be added to improve the impact resistance. The composition according to the present invention may be used as a blend for other resin and rubber materials.

Hereafter the present invention will be described in more detail with reference to the following Examples and Comparative Examples, in which the blending ratio in the tables is by weight.

The blending components, the blending ratio and the results of Examples and Comparative Examples are shown in Tables 1 to 8. Commercial polymers are used as they are in Comparative Example 1 (Tables 1 to 8), 5 (Tables 5 and 8), 6 (Table 5) and 8 (Table 8). In Comparative Example 2 (Tables 2 and 3), 3 (Table 2) and 4 (Table 3), the polyamide resin and the polyamide-rubber copolymer or the tackiness providing resin were charged at the same time in the chamber of Bravender mixer, in which the chamber is controlled at 200° C. of a chamber temperature, and at 80 rpm of the rotational speed, and the resulting mixed composition was mixed sufficiently after melting the polyamide resin until the value of mixing torque became approximately constant (5–8 min). However, in Comparative Example 3, the polyamide resin was slipped by the softened tackiness providing resin so that the mixing could not be carried out.

In Examples 1 to 17, both the polyamide-rubber copolymer and the tackiness providing resin were previously mixed by Bravender mixer at a chamber temperature of 200° C. and at 80 rpm of the rotational speed and the resulting mixed composition was then mixed with the polyamide resin in the same Bravender mixer under the same condition. That is, the polyamide-rubber copolymer and the tackiness providing resin were charged at the same time in the chamber and mixed for 5 to 10 minutes after melting the polyamide-rubber copolymer until the value of mixing torque became approximately constant. Subsequently, the resulting mixed composition was mixed with the polyamide resin for 5 to 12 minutes under the same condition.

In Examples 18 to 20, the polyamide-rubber copolymer, the tackiness providing resin, silica and TGIC were mixed previously in a two-axial extruder having a diameter of 30 mm, at 200° C. of the temperatures of cylinder, adaptor and head of the extruder, at 80 rpm of the rotational speed and in an extrusion amount of 4 to 6 kg/hr, and shaped into pellets, and then were mixed with the polyamide resin in the two-axial extruder. The mixing with nylon 12 in Example 18 was carried out at 80 rpm in an extrusion amount of 5 to 7 kg/hr at 200° C. of cylinder, adaptor and head temperature; the mixing with nylon 6 in Example 19 was carried out at 250° C. at 80 rpm, and 5 to 7 kg/hr and the mixing with nylon 66 in Example 20 was carried out at 280° C. at 80 rpm and in 5 to 7 kg/hr. The polyamide resin and the polyamide-rubber copolymer were previously sufficiently dried before mixing.

The molding of test piece of each sample was carried out of a press at a temperature by 30° C. higher than the melting point of the polyamide resin used and a sheet of about 0.5 mm of thickness was prepared. The sample was placed between two sheets of aluminum foil (thickness: about 0.1 mm) coated with a die lubricant such as DIEFREE, after preheated for about 3 minutes at the press temperature, pressed for about 10 minutes, and then taken out with the foil, immediately quenched rapidly in a cold water and annealed at 150° C. for 1 hour to obtain a test piece for the determination. Each sample was dried sufficiently before molding.

In Table 1, the combination of each kind of polyamide-rubber copolymer and the tackiness providing resin was compared with a common nylon 12 (Comparative Example 1) and, in Examples 1 to 6, the blend of 30% by weight of the blending composition (A) comprising 60% by weight of polyamide-rubber copolymer and 40% by weight of tackiness providing resin, based on the composition (A), is added to the polyamide resin. As a result, the values tan $\delta$ of dynamic viscoelasticity in Examples 1 to 6 were almost equal to or higher than the value in Comparative Example 1 over the temperature range of 60° to 120° C. In particular, the values tan $\delta$ in these examples are great, and have an excellent vibration controlling effect at high temperature, whereas the value tan $\delta$ in Comparative Example 1 becomes very small at 70° C. or more. More particularly, the use of hydrogenated rosin ester in Example 3 and terpene-phenol resin in Example 5 as the tackiness providing resin shows a very high value tan $\delta$ almost without the decrease of strength.

In Tables 2 and 3, the results are shown in which the ratio of a polyamide-rubber copolymer to a tackiness providing resin was varied. The use of cumarone-indene resin as a tackiness providing resin is shown in Table 2. As compared with nylon 12 in Comparative Example 1, the value tan $\delta$ in the two-component blending system of polyamide resin and polyamide-rubber copolymer in Comparative Example 2 is almost not changed and, accordingly, a vibration controlling effect is inferior. The two-component system of polyamide resin and tackiness providing resin in Comparative Example 3 has a poor compatibility and the mixing thereof is impossible due to the difference of the melting viscosity. To the contrary, the three-component system in Examples 7 to 9 and 4 show an improved mixing property and higher values of tan $\delta$. The use of terpene-phenol resin as the tackiness providing resin is shown in Table 3. As compared with the two-component system in Comparative Examples 2 and 4, the values tan $\delta$ in Examples 10 to 12 and 5 are great as described in Table 2. That is, this means that the presence of three components of polyamide resin, polyamide-rubber copolymer and tackiness providing resin is necessary in the polyamide resin composition according to the present invention. Further, as to the ratio of the polyamide-rubber copolymer to the tackiness providing resin, it is clearly seen that when the amount of the tackiness providing resin is less than 20% by weight based on the composition (A), the improvement of the value tan $\delta$ cannot be obtained, and when the amount is more than 80% by weight based on the composition (A), the strength or the mixing property is remarkably decreased.

The effect due to change of the mixing ratio in the blend of the polyamide resin and a mixed composition comprising 60% by weight of the polyamide-rubber based on the composition (A) and 40% by weight of the tackiness providing resin based on the composition (A) is found from Table 4. The value tan $\delta$ is improved sufficiently even in the amount of 10% by weight of the mixed composition (A) in Example 13.

Examples, in which various kinds of polyamide resins were used, are shown in Table 5. Examples 18 to 20, in which silica and TGIC were added to improve the workability in handling, show that the polyamide resin composition has increased viscosities and excellent vibration controlling performances.

In Comparative Examples 7 (Table 7) and 4 (Table 7), the polyamide resin and the functional group-containing polyolefin resin or the tackiness providing resin were charged at the same time in the chamber of Bravender mixer, in which the chamber is controlled at 200° C. of a chamber temperature and at 80 rpm of the rotational speed, and the resulting mixed composition was mixed sufficiently after melting the polyamide resin until the value of mixing torque became approximately constant (5 to 8 min).

In Examples 21 to 30, the functional group-containing polyolefin resin and the tackiness providing resin were mixed previously in Bravender mixer at a chamber temperature of 200° C. and at 80 rpm of the rotational speed and the resulting mixed composition was then mixed with the polyamide resin in the Bravender mixer under the same condition. The functional group-containing polyolefin resin and the tackiness providing resin were charged at the same time in the chamber, mixed for 5 to 10 minutes after melting the functional group-containing polyolefin resin until the value of mixing torque became approximately constant and the resulting mixed composition was mixed with the polyamide resin for 5 to 12 minutes under the same condition.

In Examples 31 and 32, the functional group-containing polyolefin resin and the tackiness providing resin were previously mixed in a two-axial extruder having a diameter of 30 mm, at 80 rpm of the rotational speed, in an extrusion amount of 4 to 6 kg/hr, and at 200° C. of the temperatures of cylinder, adaptor and head of the extruder, and shaped into pellets, and then were mixed with the polyamide resin in the two-axial extruder. The mixing with nylon 6 in Example 31 was carried out at 80 rpm in an extrusion amount of 5 to 7 kg/hr at 250° C., and the mixing with nylon 66 in Example 32 was carried out at 280° C., at 80 rpm and in 5 to 7 kg/hr. The polyamide resin and the functional group-containing polyolefin resin were dried previously sufficiently before mixing.

The molding of test piece of each sample was carried out by a press at a temperature by 30° C. higher than the melting point of the polyamide resin used and a sheet of about 0.5 mm of thickness was prepared. The sample was placed between two sheets of aluminum foil (thickness: about 0.1 mm) coated with a die lubricant such as DIEFREE, after preheated for about 3 minutes at the press temperature, pressed for about 10 minutes, and then taken out with the foil, immediately quenched rapidly in a cold water and annealed at 150° C. for 1 hour to obtain a test piece for the determination. Each sample was dried sufficiently before molding.

In Table 6, the combination of each kind of functional group-containing polyolefin resin and the tackiness providing resin was compared with a common nylon 12 (Comparative Example 1) and, in Examples 21 to 26, the blend of 30% by weight of the blending composition (A) comprising 60% by weight of the functional group-containing polyolefin resin and 40% by weight of the tackiness providing resin based on the composition (A) was added to the polyamide resin. As a result, the value tan δ of dynamic viscoelasticity in Examples 21 to 26 were almost equal to or higher than the value in Comparative Example 1 over the temperature range of 60° to 120° C. In particular, the values tan δ in these examples are great, and have an excellent vibration controlling effect at high temperatures, whereas the value tan δ in Comparative Example 1 becomes very small at 70° C. or more. More particularly, the use of hydrogenated rosin ester in Example 23 and terpenephenol resin in Example 25 as the tackiness providing resin show a very high value tan δ almost without the decrease of strength.

In Table 7, the results are shown in which the ratio of a functional group-containing polyolefin resin to a tackiness providing resin was varied. The use of terpene-phenol resin as a tackiness providing resin is shown in Table 7. As compared with the two-component systen in Comparative Examples 7 and 4, the values tan δ in Examples 27 to 30 are great. That is, this means that the presence of three components of polyamide resin, functional group-containing polyolefin resin and tackiness providing resin is necessary in the polyamide resin composition according to the present invention. Further, as to the ratio of the functional group-containing polyolefin resin to the tackiness providing resin, it is clearly seen that when the amount of the tackiness providing resin is less than 20% by weight based on the composition (A), the improvement of the value tan δ cannot be obtained, and when the amount is more than 80% by weight based on the composition (A), the strength or the mixing property is remarkably decreased.

Examples, in which various kinds of polyamide resins were used, are shown in Table 8 and show that the polyamide resin composition has increased viscosities and excellent vibration controlling performances.

The polyamide resin composition according to the present invention shows an excellent vibration controlling performance within a wide temperature range from low to high temperatures and especially improves the vibration controlling effect of polyamide resin at high temperatures, so that it may be applied for the products with many uses at the part where a high temperature and vibration are provided in the engine room of motorcar, such as cylinder head cover, oil pan, timing belt cover and the like.

A high rigidity and heat resistance other than the vibration controlling effect are required for a cylinder head cover, so that it is preferable to reinforce it with glass fiber, carbon fiber, silicon carbide fiber and inorganic filler such as talc, mica, wollastonite, etc. In this case, the amount of glass fiber used is in general 20 to 50% by weight based on the polyamide resin composition, and the amount of glass fiber used may be decreased when an inorganic filler is used. It is preferable to design the usable ratio of these components depending on the requirements for the performance and molding property of products.

TABLE 1

| | Sample | | | | | | |
|---|---|---|---|---|---|---|---|
| | Comparative Example 1 | Example | | | | | |
| | | 1 | 2 | 3 | 4 | 5 | 6 |
| Blend | | | | | | | |
| Nylon 12[*1] | 100 | 70 | 70 | 70 | 70 | 70 | 70 |
| Polyamide-rubber copolymer A[*2] | — | 18 | — | — | — | — | — |
| Polyamide-rubber copolymer B[*3] | — | — | 18 | 18 | 18 | 18 | 18 |
| Tackiness providing resin A[*4] | — | — | 12 | — | — | — | — |
| Tackiness providing resin B[*5] | — | — | — | 12 | — | — | — |
| Tackiness providing resin C[*6] | — | — | — | — | 12 | — | — |
| Tackiness providing resin D[*7] | — | 12 | — | — | — | 12 | — |
| Tackiness providing resin E[*8] | — | — | — | — | — | — | 12 |
| Tensile strength (kg/cm$^2$)[*9] | 630 | 580 | 566 | 585 | 602 | 602 | 603 |
| Elongation at break (%)[*10] | 420 | 320 | 380 | 380 | 380 | 360 | 380 |
| Dynamic viscoelasticity (tan δ)[*11] | | | | | | | |
| 60° C. | 0.102 | 0.112 | 0.130 | 0.152 | 0.160 | 0.105 | 0.101 |
| 70° C. | 0.067 | 0.114 | 0.116 | 0.132 | 0.114 | 0.103 | 0.100 |
| 80° C. | 0.041 | 0.107 | 0.104 | 0.115 | 0.097 | 0.102 | 0.095 |
| 90° C. | 0.027 | 0.093 | 0.101 | 0.103 | 0.079 | 0.085 | 0.082 |
| 100° C. | 0.026 | 0.091 | 0.090 | 0.111 | 0.058 | 0.080 | 0.083 |
| 110° C. | 0.024 | 0.090 | 0.085 | 0.116 | 0.032 | 0.097 | 0.083 |

TABLE 1-continued

|  | Sample | | | | | | |
|---|---|---|---|---|---|---|---|
|  | Comparative Example 1 | Example 1 | 2 | 3 | 4 | 5 | 6 |
| 120° C. | 0.024 | 0.104 | 0.080 | 0.114 | 0.038 | 0.103 | 0.100 |

[1] Nylon 12: DIAMID L2140 of DAISEL Chemical Industry
[2] Polyamide-rubber copolymer A: Polyamide-polyether rubber block copolymer (polypropylene oxide glycol-polycaprolactum multiblock copolymer, PEBAX 5512 MNOO of ATOCHEM Co., France)
[3] Polyamide-rubber copolymer B: Polyamide-polyether-rubber block copolymer (polytetramethylene oxide glycol-polylauryllactum multiblock copolymer, PAEE 47 L of Hurz Co., Germany)
[4] Tackiness providing resin A: YS Resin TO-105 (aromatic modified terpene resin) of Yasuhara Yushi Kogyo
[5] Tackiness providing resin B: Ester Gum HP (hydrogenated rosin ester) of Arakawa Kagaku Kogyo
[6] Tackiness providing resin C: Cumarone V 120 (cumarone-indene resin) of Nittetsu Kagaku
[7] Tackiness providing resin D: TAMANOL 803 (terpene-phenol resin) of Arakawa Kagaku Kogyo
[8] Tackiness providing resin E: PELSEN KK (polymeric rosin ester) of Arakawa Kagaku Kogyo
[9], [10] Cross head speed: 50 mm/min, 23 ± 3° C. in atmosphere
[11] Viscoelastic Spectrometer of Iwamoto Seisaku Sho; frequency 20 Hz, static strain 2.5%, dynamic strain 0.1%

Note:
tan δ (cf. Kobunshi Gakkai: Method for the Determination of High Molecules, Vol. 1, page 255, published by K. K. Baifukan)
When the vibratile deformation or stress as stimulus $$x(t) = x_o e^{i\omega t} \quad (1)$$

is represented by formula (1), $G^*(i\omega)$ which is called as complex modulus corresponding to the relaxation modulus $G(t)$ is represented by formula (2).

$$\sigma(t) = G^*(i\omega)\gamma(t) \quad (2)$$

When complex modulus $G^*(i\omega)$ is represented by formula (3), $$G^*(i\omega) = G'(\omega) + iG''(\omega) \quad (3)$$

the relation represented by formula (4) is defined.

$$\eta^*(i\omega) = \frac{\sigma(t)}{\gamma(t)} = \frac{\sigma(t)}{i\omega\gamma(t)} = \frac{G^*(i\omega)}{i\omega} = \eta' - i\eta'' = \frac{G''(\omega)}{\omega} - \frac{iG'(\omega)}{\omega} \quad (4)$$

wherein $G'(\omega)$ is dynamic modulus or storage modulus, $G''(\omega)$ is dynamic loss factor or loss modulus,
$\eta$ is dynamic viscosity represented by $\eta^* = G''(\omega)/\omega$.
Further, the tangent of phase difference angle between deformation and stress is represented by formula (5) and $$\tan \delta = \frac{G''(\omega)}{G'(\omega)} \quad (5)$$

is called as loss tangent.

TABLE 2

|  | Sample | | | | | | |
|---|---|---|---|---|---|---|---|
|  | Comparative Example | | Example | | | | Comparative |
|  | 1 | 2 | 7 | 4 | 8 | 9 | Example 3 |
| Blend |  |  |  |  |  |  |  |
| Nylon 12[1] | 100 | 70 | 70 | 70 | 70 | 70 | 70 |
| Polyamide-rubber copolymer B[3] | — | 30 | 24 | 18 | 12 | 6 | — |
| Tackiness providing resin C[6] | — | — | 6 | 12 | 18 | 24 | 30 |
| Tensile strength (kg/cm$^2$)[9] | 630 | 622 | 615 | 602 | 325 | 298 | — |
| Elongation at break (%)[10] | 420 | 410 | 390 | 380 | 220 | 10 | — |
| Dynamic viscoelasticity (tan δ)[11] |  |  |  |  |  |  |  |
| 60° C. | 0.102 | 0.076 | 0.121 | 0.160 | 0.165 | 0.188 | Impossible |
| 70° C. | 0.067 | 0.050 | 0.105 | 0.114 | 0.151 | 0.163 | to be mixed |
| 80° C. | 0.041 | 0.031 | 0.079 | 0.097 | 0.119 | 0.132 |  |
| 90° C. | 0.027 | 0.025 | 0.044 | 0.079 | 0.097 | 0.112 |  |
| 100° C. | 0.026 | 0.024 | 0.030 | 0.058 | 0.084 | 0.127 |  |
| 110° C. | 0.024 | 0.022 | 0.032 | 0.032 | 0.082 | 0.129 |  |
| 120° C. | 0.024 | 0.022 | 0.030 | 0.038 | 0.080 | 0.124 |  |

[1], [3], [6], [9], [10], [11]: See Table 1.

TABLE 3

|  | Sample | | | | | | |
|---|---|---|---|---|---|---|---|
|  | Comparative Example | | Example | | | | Comparative |
|  | 1 | 2 | 10 | 5 | 11 | 12 | Example 4 |
| Blend |  |  |  |  |  |  |  |
| Nylon 12[1] | 100 | 70 | 70 | 70 | 70 | 70 | 70 |
| Polyamide-rubber copolymer B[3] | — | 30 | 24 | 18 | 12 | 6 | — |
| Tackiness providing resin D[7] | — | — | 6 | 12 | 18 | 24 | 30 |
| Tensile strength (kg/cm$^2$)[9] | 630 | 622 | 620 | 602 | 543 | 353 | 548 |
| Elongation at break (%)[10] | 402 | 410 | 391 | 360 | 350 | 250 | 5 |
| Dynamic viscoelasticity (tan δ)[11] |  |  |  |  |  |  |  |
| 60° C. | 0.102 | 0.076 | 0.101 | 0.105 | 0.107 | 0.105 | 0.060 |
| 70° C. | 0.067 | 0.050 | 0.081 | 0.103 | 0.107 | 0.109 | 0.102 |
| 80° C. | 0.041 | 0.031 | 0.069 | 0.102 | 0.105 | 0.111 | 0.106 |
| 90° C. | 0.027 | 0.025 | 0.050 | 0.085 | 0.103 | 0.108 | 0.108 |
| 100° C. | 0.026 | 0.024 | 0.049 | 0.080 | 0.104 | 0.106 | 0.109 |
| 110° C. | 0.024 | 0.022 | 0.055 | 0.097 | 0.105 | 0.106 | 0.110 |
| 120° C. | 0.024 | 0.022 | 0.058 | 0.103 | 0.107 | 0.107 | 0.109 |

[1], [3], [7], [9], [10], [11]: See Table 1.

TABLE 4

| | Comparative Example 1 | Example 13 | Example 14 | Example 15 | Example 16 | Example 17 |
|---|---|---|---|---|---|---|
| Blend | | | | | | |
| Nylon 12[*1] | 100 | 90 | 80 | 70 | 60 | 50 |
| Polyamide-rubber copolymer A[*2] | — | 6 | 12 | 18 | 24 | 30 |
| Tackiness providing resin D[*7] | — | 4 | 8 | 12 | 16 | 20 |
| Tensile strength (kg/cm$^2$)[*9] | 630 | 555 | 548 | 375 | 220 | 210 |
| Elongation at break (%)[*10] | 420 | 330 | 360 | 250 | 180 | 40 |
| **Dynamic viscoelasticity (tan δ)[*11]** | | | | | | |
| 60° C. | 0.102 | 0.106 | 0.120 | 0.160 | 0.161 | 0.242 |
| 70° C. | 0.067 | 0.073 | 0.089 | 0.114 | 0.110 | 0.223 |
| 80° C. | 0.041 | 0.042 | 0.057 | 0.097 | 0.073 | 0.204 |
| 90° C. | 0.027 | 0.039 | 0.050 | 0.079 | 0.070 | 0.196 |
| 100° C. | 0.026 | 0.027 | 0.041 | 0.058 | 0.077 | 0.198 |
| 110° C. | 0.024 | 0.026 | 0.032 | 0.032 | 0.076 | 0.188 |
| 120° C. | 0.024 | 0.028 | 0.037 | 0.038 | 0.077 | 0.191 |

[*1], [*2], [*7], [*9], [*10], [*11]: See Table 1.

TABLE 5

| | Comparative Example 1 | Example 18 | Comparative Example 5 | Example 19 | Comparative Example 6 | Example 20 |
|---|---|---|---|---|---|---|
| Blend | | | | | | |
| Nylon 12[*1] | 100 | 70 | — | — | — | — |
| Nylon 6[*12] | — | — | 100 | 70 | — | — |
| Nylon 66[*13] | — | — | — | — | 100 | 70 |
| Polyamide-rubber copolymer B[*3] | — | 15 | — | 15 | — | 15 |
| Polyamide-rubber copolymer C[*14] | — | 2.5 | — | 2.5 | — | 2.5 |
| Tackiness providing resin C[*6] | — | 10 | — | 10 | — | 10 |
| Silica[*15] | — | 2.5 | — | 2.5 | — | 2.5 |
| TGIC[*16] | — | 0.25 | — | 0.25 | — | 0.25 |
| Tensile strength (kg/cm$^2$)[*9] | 630 | 605 | 620 | 490 | 470 | 350 |
| Elongation at break (%)[*10] | 420 | 380 | 160 | 120 | 110 | 80 |
| **Dynamic viscoelasticity (tan δ)[*11]** | | | | | | |
| 60° C. | 0.102 | 0.196 | 0.103 | 0.126 | 0.089 | 0.112 |
| 70° C. | 0.067 | 0.153 | 0.084 | 0.112 | 0.102 | 0.102 |
| 80° C. | 0.041 | 0.076 | 0.069 | 0.097 | 0.097 | 0.102 |
| 90° C. | 0.027 | 0.042 | 0.047 | 0.074 | 0.088 | 0.087 |
| 100° C. | 0.026 | 0.030 | 0.026 | 0.055 | 0.069 | 0.070 |
| 110° C. | 0.027 | 0.029 | 0.021 | 0.043 | 0.033 | 0.062 |
| 120° C. | 0.027 | 0.032 | 0.023 | 0.040 | 0.023 | 0.063 |

[*1], [*3], [*6], [*9], [*10] and [*11]: See Table 1.
[*12]Nylon 6: Amylan CM 1017 of Toray Industries Co., Ltd.
[*13]Nylon 66: Rubber modified nylon 66 (ZYTEL ST 801 of Du Pont)
[*14]Polyamide-rubber copolymer: Polyamide-polyether block copolymer (polytetramethylene oxide glycol-polylauryllactum multiblock copolymer, PEA E 62 L of Hurz Co., Germany)
[*15]Silica: Nipseal VN 3 AQ
[*16]TGIC: Triglycidyl isocyanurate

TABLE 6

| | Comparative Example 1 | Example 21 | Example 22 | Example 23 | Example 24 | Example 25 | Example 26 |
|---|---|---|---|---|---|---|---|
| Blend | | | | | | | |
| Nylon 12[*1] | 100 | 70 | 70 | 70 | 70 | 70 | 70 |
| Modified polyolefin resin A[*17] | — | 18 | — | — | — | — | — |
| Modified polyolefin resin B[*18] | — | — | 18 | 18 | 18 | 18 | 18 |
| Tackiness providing resin A[*4] | — | — | 12 | — | — | — | — |
| Tackiness providing resin B[*5] | — | — | — | 12 | — | — | — |
| Tackiness providing resin C[*6] | — | — | — | — | 12 | — | — |
| Tackiness providing resin D[*7] | — | 12 | — | — | — | 12 | — |
| Tackiness providing resin F[*19] | — | — | — | — | — | — | 12 |
| Tensile strength (kg/cm$^2$)[*9] | 630 | 590 | 280 | 550 | 490 | 480 | 270 |
| Elongation at break (%)[*10] | 420 | 370 | 220 | 350 | 360 | 360 | 250 |
| **Dynamic viscoelasticity (tan δ)[*11]** | | | | | | | |
| 60° C. | 0.102 | 0.205 | 0.182 | 0.250 | 0.224 | 0.256 | 0.190 |
| 70° C. | 0.067 | 0.207 | 0.174 | 0.232 | 0.215 | 0.238 | 0.165 |
| 80° C. | 0.041 | 0.209 | 0.178 | 0.227 | 0.190 | 0.204 | 0.154 |
| 90° C. | 0.027 | 0.210 | 0.183 | 0.203 | 0.180 | 0.206 | 0.146 |
| 100° C. | 0.026 | 0.211 | 0.185 | 0.188 | 0.182 | 0.223 | 0.158 |
| 110° C. | 0.024 | 0.212 | 0.187 | 0.170 | 0.183 | 0.221 | 0.163 |

TABLE 6-continued

|  | Sample | | | | | | |
|---|---|---|---|---|---|---|---|
|  | Comparative Example 1 | Example 21 | 22 | 23 | 24 | 25 | 26 |
| 120° C. | 0.024 | 0.212 | 0.188 | 0.164 | 0.175 | 0.235 | 0.174 |

*1, *4, *5, *6, *7, *9, *10, *11: See Table 1.
*17Modified polyolefin resin A: Acid modified polyethylene (Modic H-400F of Mitsubishi Petrochemical Co., Ltd.)
*18Modified polyolefin resin B: Ionic ethylenic copolymer (SURLINE 1856 of Du Pont, U.S.A.)
*19Tackiness providing resin F: ALCON P-135 (alicyclic saturated hydrocarbon resin) of Arakawa Kagaku Kogyo

TABLE 7

|  | Sample | | | | | | |
|---|---|---|---|---|---|---|---|
|  | Comparative Example | | Example | | | | Comparative |
|  | 1 | 7 | 27 | 28 | 29 | 30 | Example 4 |
| Blend | | | | | | | |
| Nylon 12*1 | 100 | 70 | 70 | 70 | 70 | 70 | 70 |
| Modified polyolefin resin B*18 | — | 30 | 24 | 18 | 12 | 6 | — |
| Tackiness providing resin D*7 | — | — | 6 | 12 | 18 | 24 | 30 |
| Tensile strength (kg/cm$^2$)*9 | 630 | 485 | 505 | 480 | 465 | 460 | 548 |
| Elongation at break (%)*10 | 402 | 400 | 370 | 360 | 340 | 340 | 5 |
| Dynamic viscoelasticity (tan δ)*11 | | | | | | | |
| 60° C. | 0.102 | 0.065 | 0.196 | 0.256 | 0.298 | 0.197 | 0.060 |
| 70° C. | 0.067 | 0.048 | 0.184 | 0.238 | 0.352 | 0.188 | 0.102 |
| 80° C. | 0.041 | 0.043 | 0.154 | 0.204 | 0.398 | 0.184 | 0.106 |
| 90° C. | 0.027 | 0.037 | 0.162 | 0.180 | 0.404 | 0.203 | 0.108 |
| 100° C. | 0.026 | 0.035 | 0.157 | 0.182 | 0.406 | 0.212 | 0.109 |
| 110° C. | 0.024 | 0.032 | 0.160 | 0.183 | 0.402 | 0.225 | 0.110 |
| 120° C. | 0.024 | 0.030 | 0.165 | 0.210 | 0.397 | 0.223 | 0.109 |

*1, *7, *9, *10, *11: See Table 1.
*18See Table 6.

TABLE 8

|  | Sample | | | | | |
|---|---|---|---|---|---|---|
|  | Comparative Example 1 | Example 25 | Comparative Example 5 | Example 31 | Comparative Example 8 | Example 22 |
| Blend | | | | | | |
| Nylon 12*1 | 100 | 70 | — | — | — | — |
| Nylon 6*12 | — | — | 100 | 70 | — | — |
| Nylon 66*20 | — | — | — | — | 100 | 70 |
| Modified polyolefin resin B*18 | — | 18 | — | 18 | — | 18 |
| Tackiness providing resin D*7 | — | 12 | — | 12 | — | 12 |
| Tensile strength (kg/cm$^2$)*9 | 630 | 480 | 620 | 540 | 600 | 470 |
| Elongation at break (%)*10 | 420 | 360 | 160 | 130 | 100 | 80 |
| Dynamic viscoelasticity (tan δ)*11 | | | | | | |
| 60° C. | 0.102 | 0.256 | 0.103 | 0.147 | 0.083 | 0.153 |
| 70° C. | 0.067 | 0.238 | 0.084 | 0.133 | 0.045 | 0.125 |
| 80° C. | 0.041 | 0.204 | 0.069 | 0.105 | 0.026 | 0.093 |
| 90° C. | 0.027 | 0.180 | 0.047 | 0.092 | 0.024 | 0.082 |
| 100° C. | 0.026 | 0.182 | 0.026 | 0.071 | 0.023 | 0.074 |
| 110° C. | 0.024 | 0.183 | 0.021 | 0.062 | 0.023 | 0.067 |
| 120° C. | 0.024 | 0.210 | 0.023 | 0.058 | 0.022 | 0.059 |

*1, *7, *9, *10, *11: See Table 1.
*12See Table 5.
*18See Table 6.
*20Nylon 69: AMIRAN CM3001-N of Toray Industries Co., Ltd.

While the invention has been described in detail and with reference to specific embodiments thereof, it will be apparent to one skilled in the art that various changes and modifications can be made therein without departing from the spirit and scope thereof.

What is claimed is:

1. A polyamide resin composition comprising a blend of a polyamide resin being from 50% to 90% by weight based on said polyamide resin composition, and a composition (A) being from 10% to 50% by weight based on said polyamide resin composition, said composition (A) comprising (i) a polymide-polyether rubber block copolymer or polyolefin resin, and (ii) a tackiness providing resin, with either of said polyamide-polyether rubber block copolymer or said polyolefin resin being from 80 to 20% by weight based on said composition (A), and said tackiness providing resin being from 20 to 80% by weight based on said composition (A).

2. A polyamide resin composition as claimed in claim 1, wherein the polyamide resin is from 80 to 60% by weight based on the polyamide resin composition and the composition (A) is from 20 to 40% by weight based on the polyamide resin composition.

3. A polyamide resin composition as claimed in claim 1, wherein the tackiness providing resin is either terpene-phenol resin or hydrogenated rosin ester resin.

* * * * *